United States Patent
Sakakibara (10) Patent No.: US 11,167,602 B2
(45) Date of Patent: Nov. 9, 2021

(54) PNEUMATIC TIRE

(71) Applicant: TOYO TIRE CORPORATION, Itami (JP)

(72) Inventor: Kazuhiro Sakakibara, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 81 days.

(21) Appl. No.: 16/587,525

(22) Filed: Sep. 30, 2019

(65) Prior Publication Data

US 2020/0114702 A1 Apr. 16, 2020

(30) Foreign Application Priority Data

Oct. 16, 2018 (JP) ............................... JP2018-195042

(51) Int. Cl.
 *B60C 19/00* (2006.01)
(52) U.S. Cl.
 CPC .................................. *B60C 19/002* (2013.01)
(58) Field of Classification Search
 CPC .................................................. B60C 19/002
 See application file for complete search history.

(56) References Cited

U.S. PATENT DOCUMENTS

2005/0155686 A1* 7/2005 Yukawa ................ B60C 19/002
 152/450
2014/0034204 A1* 2/2014 Sakakibara ........... B60C 19/002
 152/450

FOREIGN PATENT DOCUMENTS

| CN | 101585300 | A | | 11/2009 | |
|----|-----------|---|---|---------|---|
| CN | 206953722 | U | | 2/2018 | |
| EP | 0 870 631 | A2 | | 10/1998 | |
| JP | 2003285607 | A | * | 10/2003 | ........... B60C 19/002 |
| JP | 3621899 | B2 | | 2/2005 | |
| JP | 2005-75206 | A | | 3/2005 | |
| JP | 2005075206 | A | * | 3/2005 | ........... B60C 19/002 |

OTHER PUBLICATIONS

Extended Search Report dated Nov. 22, 2019, issued in counterpart EP Application No. 19192768.0 (8 pages).
Zhe, Sun et al., "Urban Environmental Protection", Henan Science and Technology Press, p. 270, Oct. 1996. (4 pages).
Office Action dated Jun. 28, 2021, issued in counterpart CN application No. 201910518005.6, with the English machine translation. (18 pages).

* cited by examiner

*Primary Examiner* — Justin R Fischer
*Assistant Examiner* — Philip N Schwartz
(74) *Attorney, Agent, or Firm* — Westerman, Hattori, Daniels & Adrian, LLP (57) ABSTRACT

In a pneumatic tire, a sponge member extending in a tire circumferential direction is attached around an entire circumference of a tire inner peripheral surface of a tread portion. The sponge member includes at least: a first sponge layer; a second sponge layer laminated inward of the first sponge layer in a tire radial direction; and a third sponge layer laminated inward of the second sponge layer in the tire radial direction. Each of the first sponge layer and the third sponge layer has a smaller expansion ratio than an expansion ratio of the second sponge layer.

8 Claims, 6 Drawing Sheets

PNEUMATIC TIRE

CROSS-REFERENCE TO RELATED APPLICATIONS

This application claims priority of Japanese Patent Application No.: 2018-195042 filed on Oct. 16, 2018, the content of which is incorporated herein by reference.

BACKGROUND OF THE INVENTION

Technical Field

The present invention relates to pneumatic tires.

Related Art

As one of noises caused by pneumatic tires, a cavity resonance (also referred to as a tire cavity resonance) is known. The cavity resonance is produced by resonance of air in a tire inner cavity when the air is vibrated by vibration of a tread portion caused by unevenness of a road surface and propagates in the tire inner cavity. A pneumatic tire is known in which a sponge member is attached to an inner peripheral surface of the tread portion in order to reduce the cavity resonance (see, for example, JP 3621899 B2).

In the pneumatic tire of JP 3621899 B2, the sponge member has a configuration of two-layer structure including a first sponge layer, and a second sponge layer laminated inward thereof in a tire radial direction and facing a tire inner cavity. By making an expansion ratio of the second sponge layer larger than an expansion ratio of the first sponge layer, this pneumatic tire is intended for reducing the cavity resonance through sound absorption in the first sponge layer while inhibiting reflections on an inner peripheral surface of the second sponge layer.

SUMMARY

The above pneumatic tire is intended for absorbing sound in the first sponge layer while inhibiting reflection in the second sponge layer of the sponge member facing the tire inner cavity surface. Meanwhile, it is also considered that the cavity resonance transmitted to the first sponge layer is easily transmitted from the second sponge layer having a large expansion ratio to a tire inner cavity side. Therefore, there is room for further reduction in the cavity resonance in terms of inhibiting the transmission, to the tire inner cavity side, of the sound transmitted to the sponge member.

An object of the present invention is, as to the pneumatic tire in which the sponge member is attached to the inner peripheral surface of the tread portion, to provide a pneumatic tire that can inhibit the transmission, to the tire inner cavity side, of the sound transmitted to the sponge member.

The present invention provides
a pneumatic tire including:
a tread portion; and
a sponge member extending in a tire circumferential direction over an entire circumference of a tire inner peripheral surface of the tread portion.

The sponge member includes at least:
a first sponge layer;
a second sponge layer laminated inward of the first sponge layer in a tire radial direction; and
a third sponge layer laminated inward of the second sponge layer in the tire radial direction.

Each of the first sponge layer and the third sponge layer has a smaller expansion ratio than an expansion ratio of the second sponge layer.

According to the present invention, the second sponge layer is sandwiched in the tire radial direction by the first and third sponge layers having a relatively small expansion ratio. Therefore, the tire sound transmitted from the first sponge layer to the second sponge layer is likely to be reflected by the first and third sponge layers and stay in the second sponge layer. Moreover, the second sponge layer, which has a relatively large expansion ratio, acts as an air layer. Therefore, the tire sound is attenuated by reflection in the second sponge layer, and as a result, the transmission of the tire sound to the tire inner cavity is reduced and inhibited on the input side.

Meanwhile, when part of the tire sound transmitted to the tire inner cavity is, for example, reflected by the rim and absorbed again by the sponge member, the tire sound transmitted to the second sponge layer via the third sponge layer is likely to be trapped and attenuated in the second sponge layer having a relatively large expansion ratio as described above. Therefore, it is possible to reduce the transmission to the tire inner cavity on the input side, and to reduce the sound transmitted to the tire inner cavity by reabsorption, thereby effectively reducing the cavity resonance in the tire inner cavity.

Preferably, the first sponge layer has a smaller expansion ratio than an expansion ratio of the third sponge layer.

According to this configuration, the tire sound generated by the vibration of the tread portion is suitably reduced in the first sponge layer on the input side before being transmitted to the tire inner cavity. This effectively reduces the cavity resonance caused by resonance in the tire inner cavity.

Preferably, each of the first sponge layer, the second sponge layer, and the third sponge layer has an identical height in the tire radial direction.

According to this configuration, sound absorption in the first and third sponge layers and attenuation in the second sponge layer are implemented in a well-balanced manner. Therefore, the tire sound transmitted to the tire inner cavity is further reduced. As a result, the cavity resonance in the tire inner cavity is further reduced.

Preferably, a hollow portion adjacent to the second sponge layer is provided.

According to this configuration, in addition to the attenuation in the second sponge layer, the attenuation in the hollow portion can further reduce the tire sound transmitted to the tire inner cavity. Therefore, the cavity resonance in the tire inner cavity is still further reduced.

Preferably, an interface between the second sponge layer and the first sponge layer is formed in an uneven shape, and/or an interface between the second sponge layer and the third sponge layer is formed in an uneven shape.

According to this configuration, it is easy to cause irregular reflection of the tire sound on the uneven interface between the second sponge layer and the first and/or third sponge layer. As a result, the tire sound can be further reduced in the second sponge layer. Accordingly, the tire sound transmitted to the tire inner cavity is reduced, and thus the cavity resonance is further reduced in the tire inner cavity.

Preferably, the expansion ratio of the first sponge layer is between 286% and 400% inclusive,
the expansion ratio of the second sponge layer is between 500% and 800% inclusive, and
the expansion ratio of the third sponge layer is between 333% and 600% inclusive.

According to this configuration, the tire sound can be easily reflected on the interface between the second sponge layer and the first and third sponge layers, the tire sound can be easily trapped in the second sponge layer, and the present invention can be effectively implemented.

According to the present invention, as to the pneumatic tire in which the sponge member is attached to the inner peripheral surface of the tread portion, the transmission of the sound transmitted to the sponge member to the tire inner cavity side can be inhibited.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

An embodiment according to the present invention will be described below with reference to the accompanying drawings. Note that the following description is essentially illustrative only and is not intended to limit the present invention, its application, or its use. The drawings are schematic, and a ratio of each size is different from an actual ratio.

Figure 1:
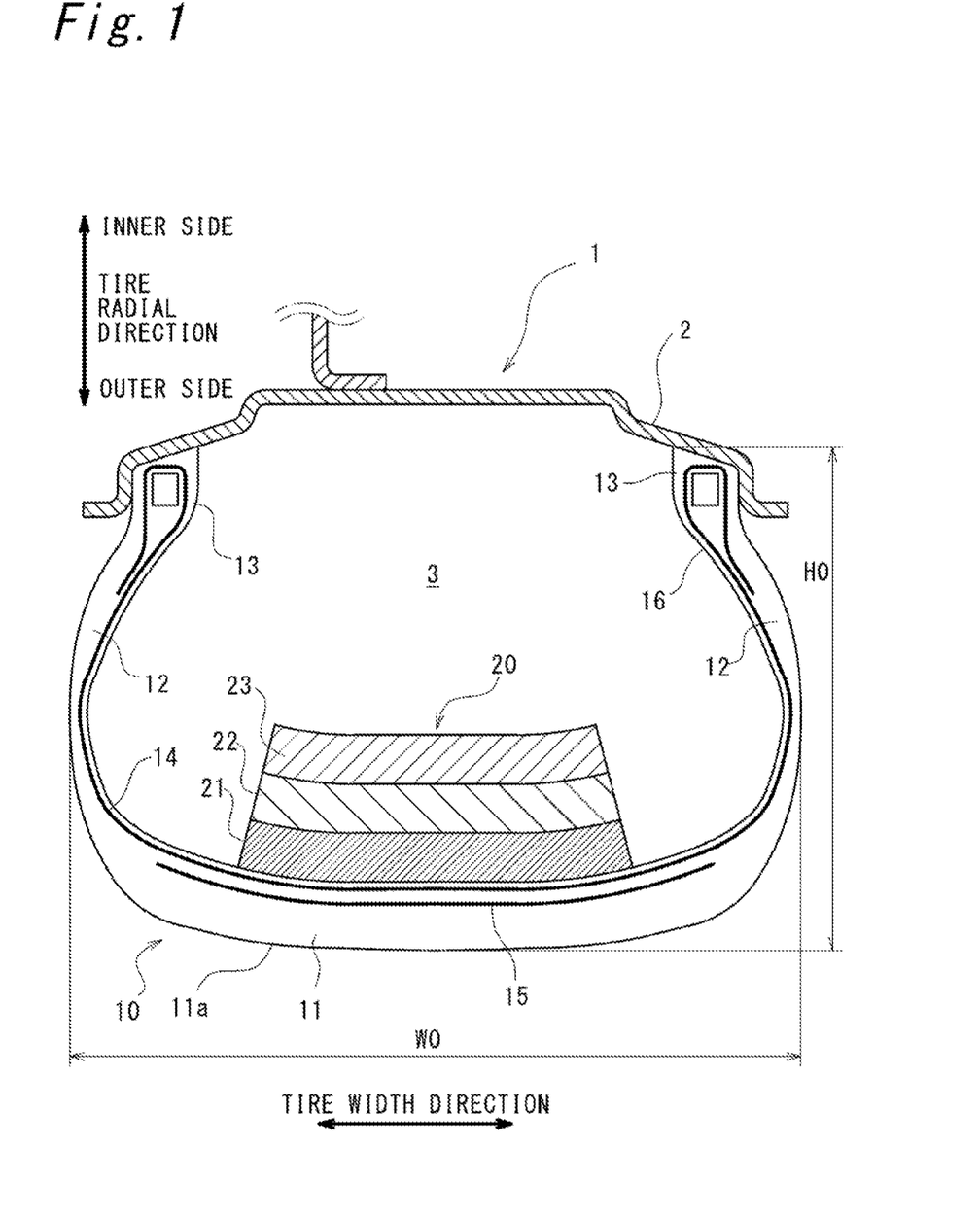
FIG. 1 is a meridional cross-sectional view of a rim assembly according to an embodiment of the present invention.
Figure 2:
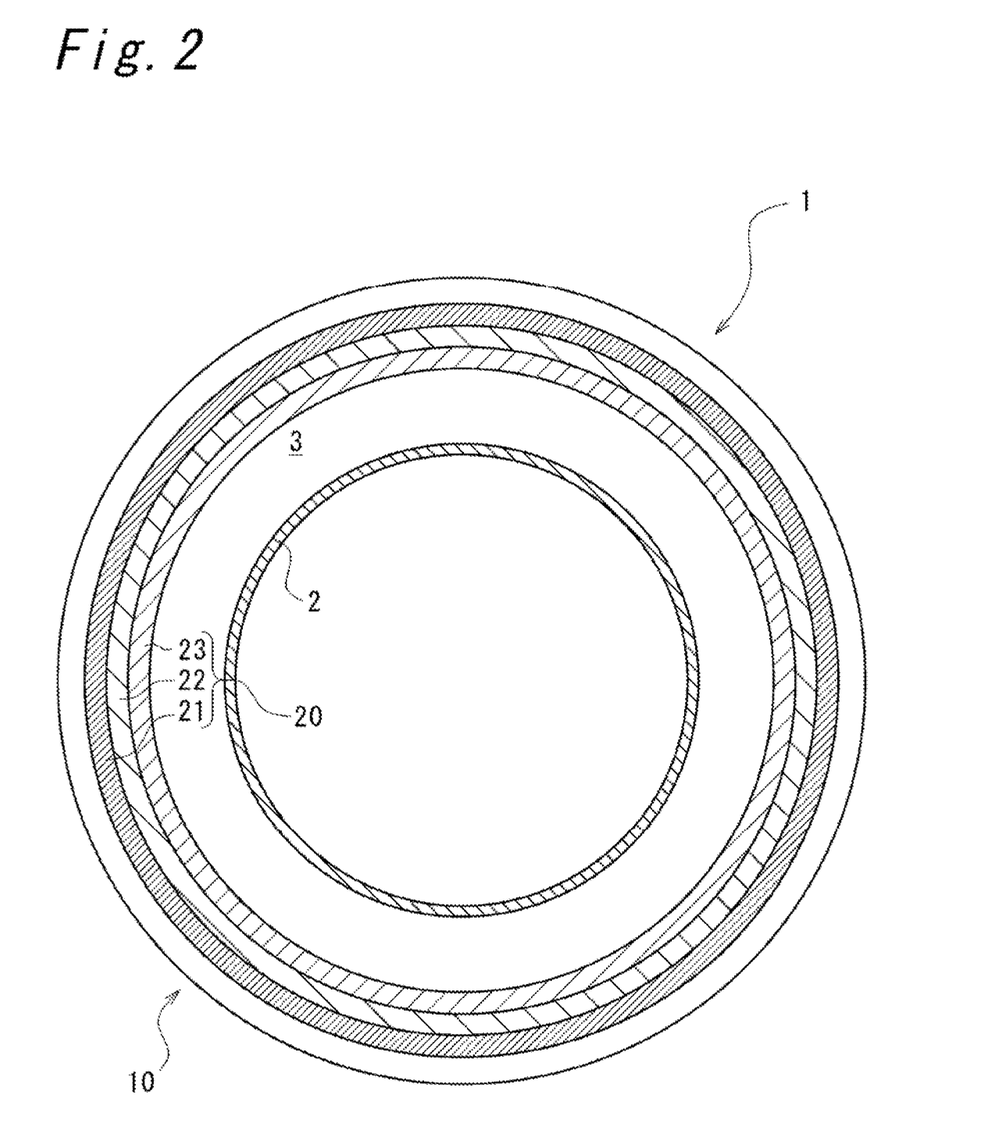
FIG. 2 is a cross-sectional view in a tire equatorial plane of the rim assembly of FIG. 1.

FIG. 1 is a meridional cross-sectional view of a tire rim assembly 1 according to an embodiment of the present invention. FIG. 2 is a cross-sectional view in a tire equatorial plane of the tire rim assembly 1. As shown in FIGS. 1 and 2, the tire rim assembly 1 is an assembly in which a pneumatic tire 10 is assembled on an outer periphery of a rim 2. A tire inner cavity 3 is defined between an outer periphery of the rim 2 and an inner surface of the pneumatic tire 10.

The pneumatic tire 10 includes a tread portion 11 in which a tread surface 11a is formed on an outer surface as a ground contact surface, a pair of sidewall portions 12 extending inward in a tire radial direction from both ends in a tire width direction of the tread portion 11, and a pair of bead portions 13 positioned at inner ends in a tire radial direction of the one pair of sidewall portions 12.

A carcass ply 14 is laid over a tire inner surface side of the tread portion 11 and the sidewall portions 12 between the one pair of bead portions 13. A belt layer 15 is wound in a tire circumferential direction between the tread portion 11 and the carcass ply 14. An inner liner 16 is disposed on a tire inner surface side of the carcass ply 14. The inner liner 16 is formed of a material that is hardly permeable to air.

In the pneumatic tire 10, a sponge member 20 is attached to the inner liner 16 that constitutes the tire inner surface. The sponge member 20 is a porous body, and includes open cells or closed cells obtained by foaming a rubber, a synthetic resin, or other materials. As the sponge member 20, for example, a polyurethane-based sponge can be employed, and various other sponge-like materials can also be employed. For attaching the sponge member 20 to the inner liner 16, an appropriate joining method such as an adhesive or double-sided tape can be employed.

As shown in FIG. 2, the sponge member 20 extends annularly over the entire circumference of the tire circumferential direction. The sponge member 20 is formed as a multilayer structure in which a plurality of layers is laminated in the tire radial direction. In the present embodiment, the sponge member 20 has a three-layer structure in which a first sponge layer 21, a second sponge layer 22, and a third sponge layer 23 are sequentially laminated from the inner liner 16 side to the tire inner cavity 3 side.

The sponge member 20 is formed by joining the individually formed first to third sponge layers 21 to 23 each other with an adhesive or a double-sided tape. Other joining methods such as heat seal and ultrasonic bonding can be used. By forming the sponge member 20 while changing the expansion ratio, it is possible to integrally form the sponge member 20 in which layers having different expansion ratios are laminated.

Figure 3:
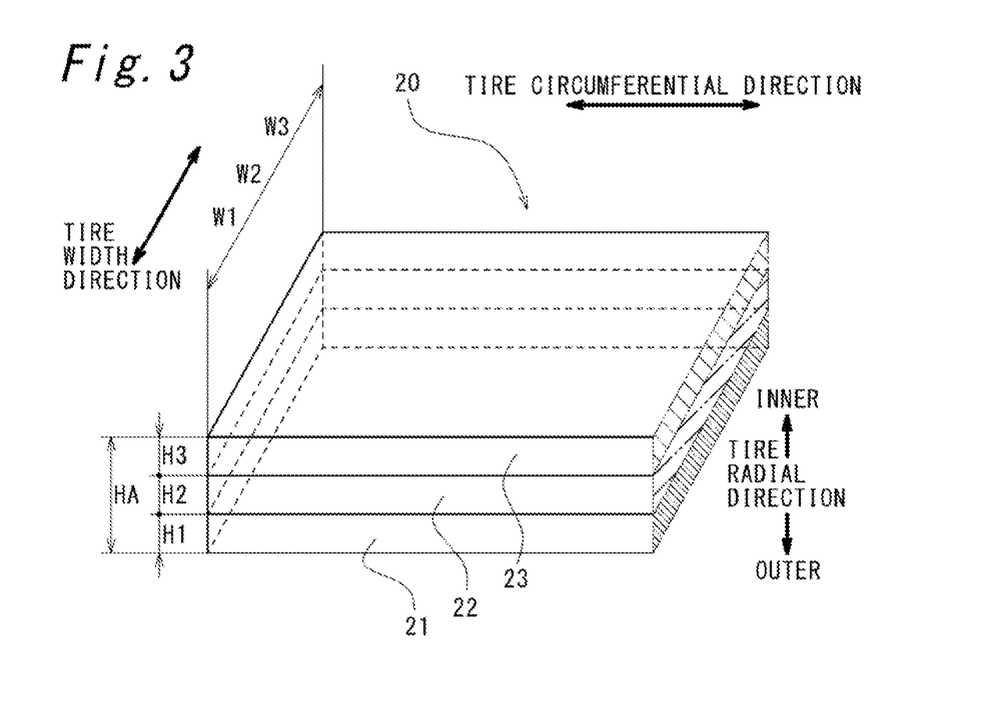
FIG. 3 is a single perspective view of a sponge member.

FIG. 3 is a single perspective view of the sponge member 20, showing the sponge member 20 that is not annularly wound. Note that sizes of respective portions of the sponge member 20 are measured based on the state shown in FIG. 3. As shown in FIG. 3, lengths W1 to W3 of the first to third sponge layers 21 to 23 in the tire width direction are set substantially the same between 30% and 70% inclusive of a tire width W0 of the pneumatic tire 10 (see FIG. 1), respectively.

Heights H1 to H3 in the tire radial direction of the first to third sponge layers 21 to 23 are respectively set at one third of a height HA in the tire radial direction obtained by adding the heights of the first to third sponge layers 21 to 23 (that is, height of the sponge member 20). The height HA in the tire radial direction is set at 20 mm or more and 50% or less of a sectional height H0 of the pneumatic tire 10 (see FIG. 1). Note that a cavity resonance is likely to occur in a frequency band of 200 Hz to 250 Hz, and its wavelength is fixed. Therefore, the heights H1 to H3 in the tire radial direction of the first to third sponge layers are preferably set to the same height.

Note that the sectional height H0 of the pneumatic tire 10 is calculated by multiplying the tire width W0 by oblateness.

The first and third sponge layers 21 and 23 are smaller relative to the second sponge layer 22 in terms of expansion ratio. The first sponge layer 21 is smaller relative to the third sponge layer 23 in terms of expansion ratio. Therefore, the sponge member 20 is formed such that the expansion ratio increases in order of the first sponge layer 21, the third sponge layer 23, and the second sponge layer 22. In other words, the sponge member 20 is formed such that a void rate and porosity increase in order of the first sponge layer 21, the third sponge layer 23, and the second sponge layer 22.

Specifically, the first to third sponge layers 21 to 23 are set such that the expansion ratio increases in order of the first sponge layer 21, the third sponge layer 23, and the second sponge layer 22 within a range of the expansion ratio from 286% to 800%. Preferably, the expansion ratio of the first sponge layer 21 is set between 286% and 400% inclusive. The expansion ratio of the second sponge layer 22 is set between 500% and 800% inclusive. The expansion ratio of the third sponge layer 23 is set between 333% and 600% inclusive.

The first to third sponge layers 21 to 23 are formed by foaming the same material at different expansion ratios. The specific gravity decreases in order of the first sponge layer 21, the third sponge layer 23, and the second sponge layer.

Specifically, the specific gravity of the first sponge layer 21 is between 0.30 g/cm³ and 0.35 g/cm³ inclusive. The specific gravity of the second sponge layer 22 is between 0.15 g/cm³ and 0.20 g/cm³ inclusive. The specific gravity of the third sponge layer 23 is between 0.20 g/cm³ and 0.30 g/cm³ inclusive.

Figure 4:
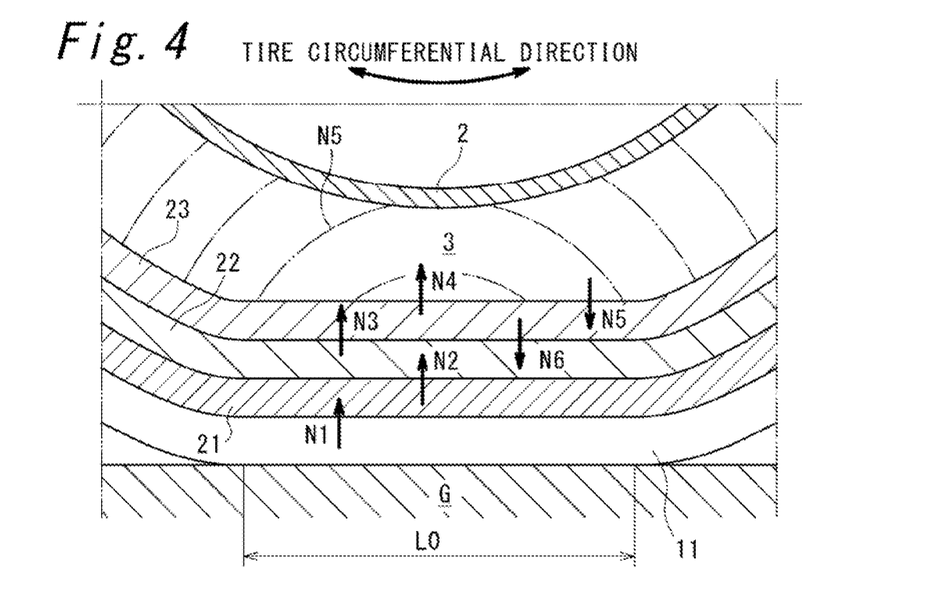
FIG. 4 is a cross-sectional view showing a tire inner cavity of the rim assembly when brought into contact with the ground.

FIG. 4 is a cross-sectional view similar to FIG. 2, showing a periphery of a ground contact portion of a tire rim assembly 1 in an enlarged manner. As shown in FIG. 4, the tire rim assembly 1 is configured to be in contact with a road surface with a ground contact length L0 on the tire equatorial plane when filled with air at a prescribed air pressure.

As shown in FIG. 4, when the tire rim assembly 1 is rolling on a road surface, a vibration in the tire radial direction can occur in the tread portion 11 due to unevenness of the road surface G. At this time, the vibration of the tread portion 11 is transmitted to air in the tire inner cavity 3 and becomes a tire sound N1. Since the sponge member 20 is attached to the inner peripheral surface of the tread portion 11, the tire sound N1 is reduced by sound absorption by the sponge member 20.

Here, the sponge member 20 is formed as a three-layer structure including the first to third sponge layers 21 to 23. Therefore, the tire sound N1 is first absorbed by the first sponge layer 21. The first sponge layer 21, which has a smaller expansion ratio (larger specific gravity) relative to the second and third sponge layers 22 and 23, has low air permeability. The tire sound N1 is suitably absorbed by the first sponge layer 21, becomes a tire sound N2, and is transmitted to the second sponge layer 22.

The second sponge layer 22 has a larger expansion ratio (smaller specific gravity) relative to the first and third sponge layers 21 and 23. Therefore, the tire sound N2 transmitted to the second sponge layer 22 is likely to be reflected on interfaces between the second sponge layer 22 and the first and third sponge layers 21 and 23 having lower air permeability relative to the second sponge layer 22, and is likely to be trapped in the second sponge layer 22. Moreover, the second sponge layer 22, which has a large expansion ratio (smaller specific gravity), has high air permeability and can act as an air layer. As a result, the tire sound N2 is trapped in the second sponge layer 22 and attenuated by reflection, becomes a tire sound N3, and is transmitted to the third sponge layer 23.

The third sponge layer 23, which has a smaller expansion ratio (larger specific gravity) relative to the second sponge layer 22, has low air permeability. The tire sound N3 is suitably absorbed by the third sponge layer 23, becomes a tire sound N4, and is transmitted to the tire inner cavity 3.

The tire sound N4 transmitted to the tire inner cavity 3 propagates radially from a ground contact portion, and can become a cavity resonance N5 by resonance. Part of the cavity resonance N5 may be reflected by the rim 2 to the sponge member 20 side. In this case, the cavity resonance N5 is first absorbed by the third sponge layer 23, becomes a tire sound N6, and is transmitted to the second sponge layer 22.

The tire sound N6 transmitted to the second sponge layer 22 is likely to be reflected by the first and third sponge layers 21 and 23 and stay in the second sponge layer 22, as described above. The tire sound N6 is attenuated by reflection in the second sponge layer 22 that can act as an air layer.

Therefore, the tire sound is reduced by the sponge member 20 both at the time of vibration input from the tread portion 11 and after becoming the cavity resonance N5.

As described above, the cavity resonance has a frequency of 200 Hz to 250 Hz and a substantially constant wavelength. A sound absorption (attenuation) mechanism by the sponge member 20 is produced by entry (passage) of sound into each of the first to third sponge layers 21 to 23. Therefore, the sponge member 20 is formed by laminating the first to third sponge layers 21 to 23 having different expansion ratios (specific gravity and air permeability). Repetitive reflection and passage of the sound in each layer reduce (attenuate) the sound effectively. Therefore, the first to third sponge layers 21 to 23 are preferably set to have the same thickness in order to effectively produce reflection and attenuation in each of the sponge layers 21 to 23 rather than attenuation due to a difference in the thicknesses (distances) of the sponge layers 21 to 23. Meanwhile, from a viewpoint of manufacturing, it is easier to handle the first to third sponge layers 21 to 23 having the same thickness than different thicknesses. From this point as well, the first to third sponge layers 21 to 23 are preferably set to have the same thickness.

The tire rim assembly 1 described above performs the following effects.

(1) The second sponge layer 22 is sandwiched in the tire radial direction by the first and third sponge layers 21 and 23 having relatively small expansion ratios. Therefore, the tire sound transmitted from the first sponge layer 21 to the second sponge layer 22 is likely to be reflected by the first and third sponge layers 21 and 23, and to stay in the second sponge layer 22. Moreover, the second sponge layer 22, which has a relatively large expansion ratio (relatively small specific gravity), has high air permeability and acts as an air layer. Therefore, the tire sound is attenuated by reflection in the second sponge layer 22, and as a result, the transmission of the tire sound to the tire inner cavity 3 is reduced and inhibited on the input side.

Meanwhile, when part of the tire sound transmitted to the tire inner cavity 3 is, for example, reflected by the rim 2 and absorbed again by the sponge member 20, the tire sound transmitted to the second sponge layer 22 via the third sponge layer 23 is likely to stay and is attenuated in the second sponge layer 22 having a relatively large expansion ratio (relatively small specific gravity) and high air permeability, as described above. This makes it possible to reduce the transmission to the tire inner cavity 3 on the input side and to reduce the sound transmitted to the tire inner cavity 3 by reabsorption. As a result, the cavity resonance N5 in the tire inner cavity 3 is reduced effectively.

(2) The first sponge layer 21 has a smaller expansion ratio (larger specific gravity) and lower air permeability relative to the third sponge layer 23. Accordingly, the tire sound generated by the vibration of the tread portion 11 is suitably reduced in the first sponge layer 21 on the input side before being transmitted to the tire inner cavity 3. Therefore, the cavity resonance N5 generated by the tire sound resonating in the tire inner cavity 3 is effectively reduced.

(3) The first to third sponge layers 21 to 23 are formed so as to have the heights H1 to H3 in the tire radial direction which are substantially identical. Accordingly, the sound absorption in the first and third sponge layers and the attenuation in the second sponge layer are implemented in a well-balanced manner. Therefore, the tire sound transmitted to the tire inner cavity 3 is further reduced. As a result, the cavity resonance N5 in the tire inner cavity 3 is further reduced.

(4) The height HA in the tire radial direction of the sponge member 20 is set at 50% or less of the sectional height H0 of the pneumatic tire 10. Therefore, it is easy to obtain the reduction effect of the cavity resonance N5 while inhibiting deterioration of ease of assembling the rim. That is, when the height HA of the sponge member 20 is greater than 50% of the tire sectional height H0, the sponge member 20 is likely to interfere with the rim 2 during assembly of the rim, deteriorating ease of assembling the rim.

(5) The width of the sponge member 20 in the tire width direction is between 30% and 70% inclusive of the tire width W0 of the pneumatic tire 10. Therefore, it is easy to obtain the reduction effect of the cavity resonance N5 by the sponge member 20 while maintaining ease of attaching the sponge member 20 along the inner peripheral surface of the tread portion 11. That is, if the width of the sponge member 20 is less than 30% of the tire width W0, it is difficult to sufficiently obtain the reduction effect of the cavity resonance N5. Meanwhile, if the width of the sponge member 20 is greater than 70% of the tire width W0, the sponge member 20 is likely to interfere with the sidewall portions 12 and to be bent, ease of attachment deteriorates, and ease of adhesion to the inner liner 16 easily deteriorates.

In the above embodiment, the sponge member 20 includes three layers: the first to third sponge layers 21 to 23, but may have a multilayer structure of four or more layers.

In the above embodiment, the first sponge layer 21 is smaller relative to the third sponge layer 23 in terms of expansion ratio, but the present invention is not limited thereto. That is, the expansion ratio of the second sponge layer 22 is required at least to be larger than the expansion ratio of the other layers. The expansion ratio may be the same between the first sponge layer 21 and the third sponge layer 23, or the third sponge layer 23 may be smaller relative to the first sponge layer 21 in terms of expansion ratio. However, it is preferable to make the expansion ratio smaller in the first sponge layer 21 than in the third sponge layer 23, from a viewpoint of effectively reducing the tire sound N1 that is input from the tread portion 11 on the input side.

In the above embodiment, the first to third sponge layers 21 to 23 are formed of the same material. However, the expansion ratio of the second sponge layer 22 is required at least to be larger than the expansion ratio of the first and third sponge layers 21 and 23, and the first to third sponge layers 21 to 23 may be formed of different materials.

Figure 5A:
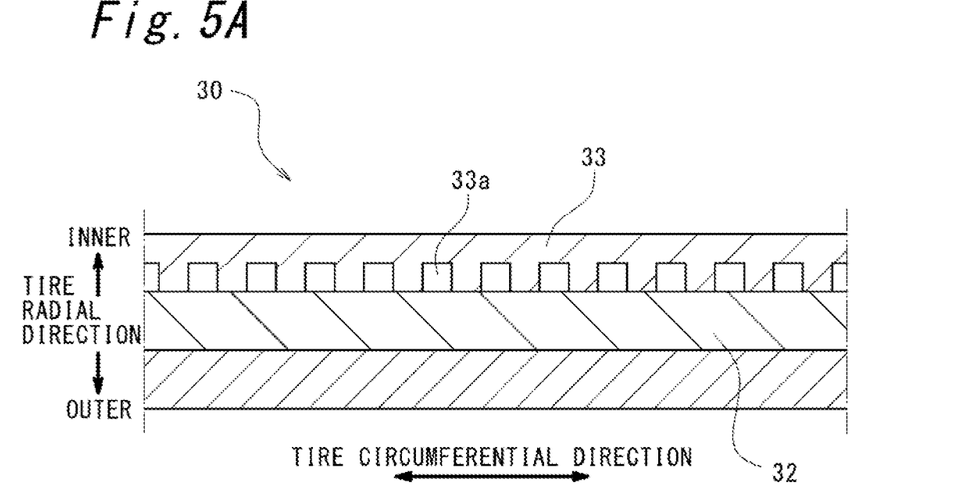
FIG. 5A is a cross-sectional view showing a sponge member according to a modification.
Figure 5B:
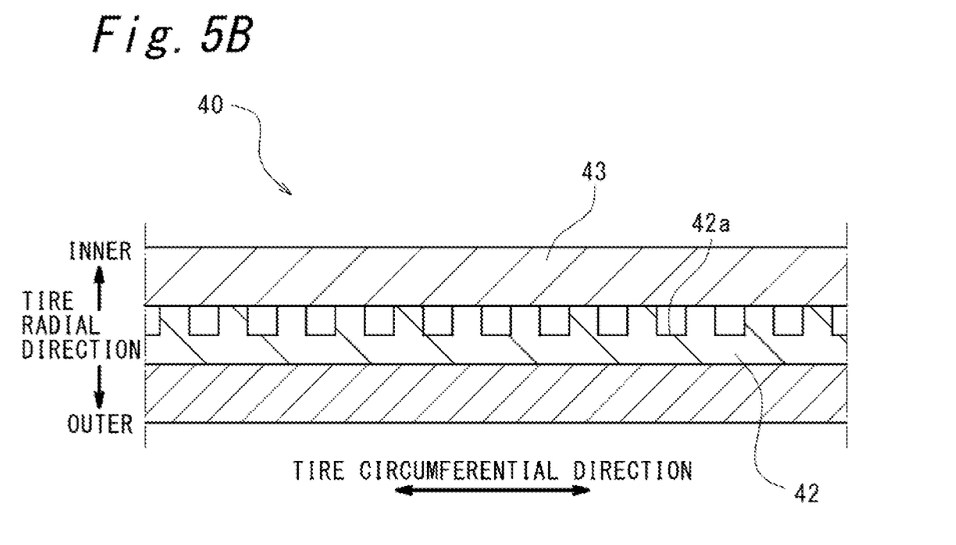
FIG. 5B is a cross-sectional view showing a sponge member according to a modification.
Figure 5C:
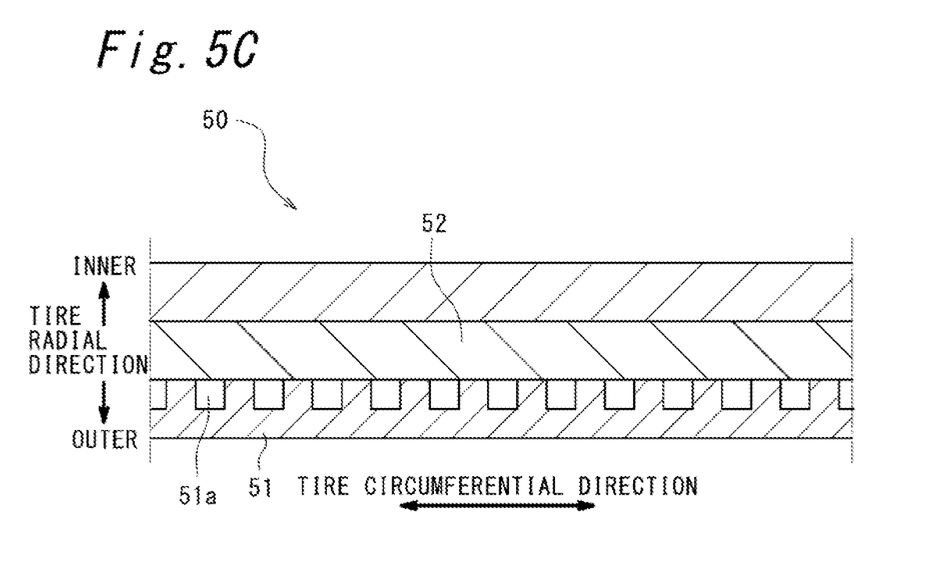
FIG. 5C is a cross-sectional view showing a sponge member according to a modification.

FIGS. 5A to 5C are cross-sectional views along the tire circumferential direction, showing sponge members 30 to 50 according to first to third modifications, respectively. The sponge members 30 to 50 according to the first to third modifications are different from the sponge member 20 in that hollow portions adjacent to the second sponge layer 22 are provided.

As shown in FIG. 5A, the sponge member 30 according to the first modification is formed, on an outer surface thereof in the tire radial direction, with rectangular grooves 33a penetrating the sponge member 30 in the tire width direction. Accordingly, in the sponge member 30, hollow portions adjacent to an inner surface of a second sponge layer 32 in the tire radial direction are formed by the grooves 33a. As a result, volume of the grooves 33a is added to volume of the second sponge layer 32 that can act as an air layer, and thus the tire sound is further reduced by reflection by the air layer having the increased volume.

Since the interface between the second sponge layer 32 and the third sponge layer 33 is formed in an uneven shape by the grooves 33a formed in a rectangular shape, irregular reflection is likely to occur. This also further reduces the tire sound staying in the air layer formed of the second sponge layer 32 and the grooves 33a.

As shown in FIG. 5B, the sponge member 40 according to the second modification is formed, on an inner surface thereof in the tire radial direction, with rectangular grooves 42a penetrating the sponge member 40 in the tire width direction. Accordingly, in the sponge member 40, hollow portions adjacent to the inner surface of the second sponge layer 42 in the tire radial direction are formed by the grooves 42a. Although illustration is omitted, the sponge member 40 may be formed, on an outer surface of the second sponge layer 42 in the tire radial direction, with rectangular grooves penetrating the sponge member 40 in the tire width direction. In this case, hollow portions adjacent to the outer surface of the second sponge layer 42 in the tire radial direction are formed by the grooves.

As shown in FIG. 5C, the sponge member 50 according to the third modification is formed, on an inner surface of a first sponge layer 51 in the tire radial direction, with rectangular grooves 51a penetrating the sponge member 50 in the tire width direction. Accordingly, in the sponge member 50, hollow portions adjacent to an outer surface of a second sponge layer 52 in the tire radial direction are formed by the grooves 51a.

Although illustration is omitted, the second sponge layer or the first and third sponge layers may be formed with grooves in order to provide hollow portions on both sides of the second sponge layer in the tire radial direction.

Figure 6A:
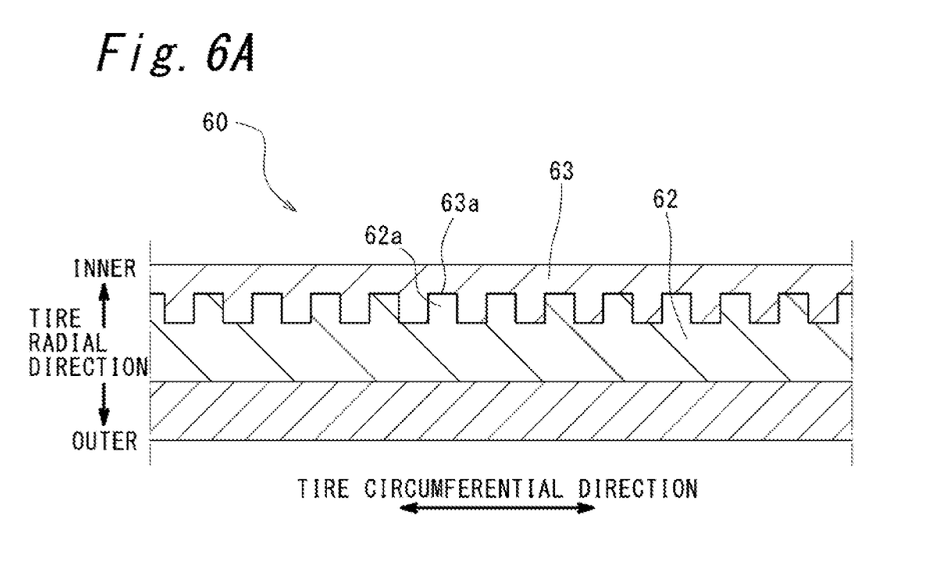
FIG. 6A is a cross-sectional view showing a sponge member according to a modification.
Figure 6B:
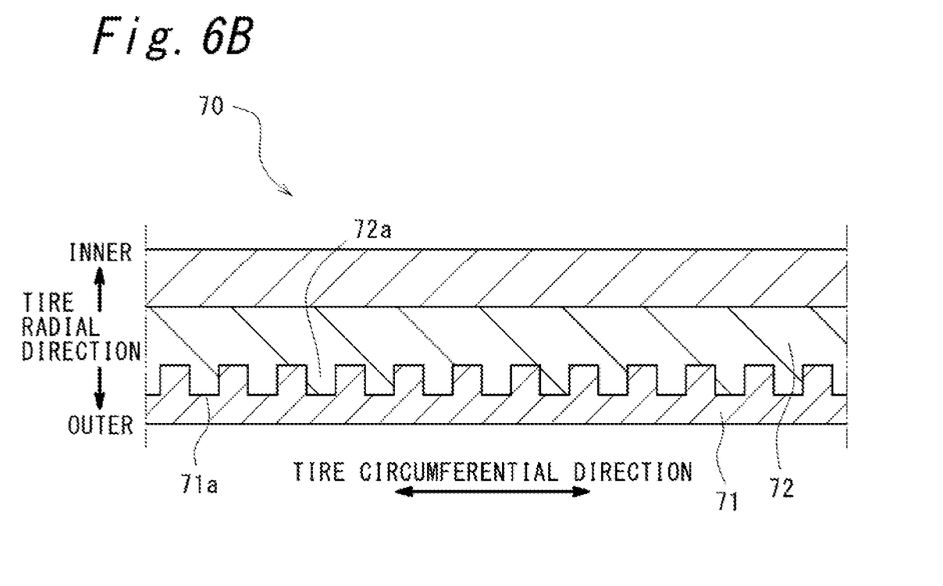
FIG. 6B is a cross-sectional view showing a sponge member according to a modification.

FIGS. 6A and 6B are cross-sectional views along the tire circumferential direction, showing sponge members 60 and 70 according to fourth and fifth modifications, respectively. The sponge members 60 and 70 according to the fourth and fifth modifications are different from the sponge member 20 in that interfaces between the second sponge layer and the first and/or third sponge layer are formed in an uneven shape.

As shown in FIG. 6A, in the sponge member 60 according to the fourth modification, the interface between second and third sponge layers 62 and 63 is formed in an uneven shape. Specifically, the third sponge layer 63 is formed, on an outer surface thereof in the tire radial direction, with rectangular grooves 63a, and the second sponge layer 62 is formed, on an inner surface thereof in the tire radial direction, with protrusions 62a protruding complementarily to the grooves 63a. Accordingly, irregular reflection is likely to occur on the interface between the second and third sponge layers 62 and 63, and the tire sound staying in the second sponge layer 62 is further reduced. Conversely, the second sponge layer 62 may be formed with grooves, and the third sponge layer 63 may be formed with protrusions protruding complementarily to the grooves.

As shown in FIG. 6B, in the sponge member 70 according to the fifth modification, the interface between first and second sponge layers 71 and 72 is formed in an uneven shape. Specifically, the first sponge layer 71 is formed, on an inner surface thereof in the tire radial direction, with rectangular grooves 71a, and the second sponge layer 72 is formed, on an outer surface thereof in the tire radial direction, with protrusions 72a protruding complementarily to the grooves 71a. Conversely, the second sponge layer 72 may be formed with grooves, and the first sponge layer 71 may be formed with protrusions protruding complementarily to the grooves.

Although illustration is omitted, both of the interfaces between the second sponge layer and the first and third sponge layers may be formed in an uneven shape.

In the above modifications, the grooves are formed to extend penetrating the sponge layer in the tire width direction, but the present invention is not limited thereto. The grooves may not penetrate the sponge layer, and may be formed to extend in the tire circumferential direction. Instead of the grooves, a configuration having a plurality of recesses or protrusions may be used. According to this configuration as well, hollow portions adjacent to the second sponge layer can be provided, and the interfaces between the second sponge layer and the first and third sponge layers can be formed in an uneven shape.

Note that the present invention is not limited to the configurations described in the above embodiment, and various modifications are possible.

What is claimed is:

1. A pneumatic tire comprising:
   a tread portion; and
   a sponge member extending in a tire circumferential direction over an entire circumference of a tire inner peripheral surface of the tread portion,
   wherein the sponge member includes at least:
   a first sponge layer;
   a second sponge layer laminated inward of the first sponge layer in a tire radial direction; and
   a third sponge layer laminated inward of the second sponge layer in the tire radial direction, and
   each of the first sponge layer and the third sponge layer has a smaller expansion ratio than an expansion ratio of the second sponge layer.

2. The pneumatic tire according to claim 1,
   wherein the first sponge layer has a smaller expansion ratio than an expansion ratio of the third sponge layer.

3. The pneumatic tire according to claim 1,
   wherein each of the first sponge layer, the second sponge layer, and the third sponge layer has an identical height in the tire radial direction.

4. The pneumatic tire according to claim 1,
   wherein a hollow portion adjacent to the second sponge layer is provided.

5. The pneumatic tire according to claim 1,
   wherein an interface between the second sponge layer and the first sponge layer is formed in an uneven shape and/or an interface between the second sponge layer and the third sponge layer is formed in an uneven shape.

6. The pneumatic tire according to claim 1,
   wherein the expansion ratio of the first sponge layer is between 286% and 400% inclusive,
   the expansion ratio of the second sponge layer is between 500% and 800% inclusive, and
   the expansion ratio of the third sponge layer is between 333% and 600% inclusive.

7. The pneumatic tire according to claim 1,
   wherein a plurality of grooves extending in a tire width direction are provided repeatedly in the tire circumferential direction in at least one of the first sponge layer, second sponge layer, and third sponge layer, on a side thereof facing another one of the first sponge layer, second sponge layer, and third sponge layer.

8. The pneumatic tire according to claim 7,
   wherein the plurality of grooves are provided in at least one of the first sponge layer and the third sponge layer, on the side thereof facing the second sponge layer, and
   wherein the second sponge layer includes a plurality of protrusions extending in the tire width direction provided repeatedly in the tire circumferential direction, each of the plurality of protrusions fitting respectively into each of the plurality of grooves.

* * * * *